Jan. 23, 1968    J. H. KRESS    3,365,035
FLUID ENGAGED CLUTCH MODULATED BY TRANSMISSION RATIO
Filed April 8, 1966

INVENTOR.
J. H. KRESS

United States Patent Office 3,365,035
Patented Jan. 23, 1968

3,365,035
FLUID ENGAGED CLUTCH MODULATED BY TRANSMISSION RATIO
James Henry Kress, Cedar Falls, Iowa, assignor to Deere & Company, Moline, Ill., a corporation of Delaware
Filed Apr. 8, 1966, Ser. No. 541,324
5 Claims. (Cl. 192—3.5)

This invention relates to a hydraulic clutch control and more particularly to improvements in a clutch pressure-modulated system employed with a clutch located behind or at the output side of a variable-speed transmission.

Smooth engagement of a hydraulically-applied clutch is conventionally achieved by fluid pressure modulation, a system of balancing hydraulic force (sometimes called "bucking pressure") on the clutch-apply piston against one side of a clutch control valve in opposition to a loading spring interposed between the other end of the valve and the clutch pedal, for example. This results in proportional loading of the clutch plates and thus enables the clutch to pick up the load in accordance with the position of the clutch pedal. Since the loading spring pressure varies according to the clutch pedal position—being least when the pedal is fully depressed—the clutch pressure is modulated as a function of clutch pedal position. Or, the hydraulic force (bucking pressure) acting on the valve is directly proportional to the modulated system pressure that occurs by metering pump pressure to reservoir so that, as clutch pressure increases, the net force required by the operator's foot to hold the clutch pedal depressed decreases. Operator effort is greatest when the pedal is fully depressed, and vice versa. The changing reaction between fully depressed and fully released positions of the pedal tends to give the operator the same type of resistance or "feel" as experienced with a conventional mechanically spring-loaded clutch.

In a power train in which the clutch is located behind, or at the output side of, the variable-speed transmission, however, a typical pressure-modulated control may be suitable, because nominal clutch torque varies inversely as output speed, for example, within the rather wide ranges required in automotive vehicles such as tractors to accommodate ground speeds and pulling ability. Since clutch torque and clutch hydraulic pressure are proportional, maximum hydraulic pressure also varies within the same range.

A clutch located at the output side of such variable-speed transmission must be designed to transmit the highest obtainable torque that would occur at the lowest speed, assuming that full capacity of the prime mover is utilized. But such clutch at high-speed, low-torque conditions would have the ability to transmit torque far in excess of that necessary; that is, clutch capacity and therefore clutch pressure would be unnecessarily high. This represents at least two basic control disadvantages at high transmission ratios. First, the clutch loses its ability to slip and hence cannot operate as a torque limiter. Second, clutch pedal travel during engagement and disengagement of the clutch becomes extremely short and deprives the operator of complete control over clutch re-engagement, resulting in shock loading of the power train and lurching of the vehicle. Both are particularly bad in the control of agricultural or industrial tractors, especially during maneuvering.

The principal object of the invention is to provide a novel clutch control in a power train where the clutch is behind or connected to the output side of a variable-speed transmission, or any transmission having more than one speed. In particular, the invention aims to provide such control with all the advantages of pressure modulation. Still more specifically, an object is to provide comparable clutch control through the same range of pedal travel for any transmission speed.

Briefly, and in general, these objects are accomplished by utilizing a pressure differential on the clutch control valve and by controlling this pressure differential by a variable orifice regulated according to transmission ratio so that the ultimate result is that clutch pressure varies inversely with transmission speed. In one form of the invention, a feedback pressure is applied to the control valve to supplement the loading spring force against the bucking pressure at the other end of the valve. In another form, the bucking pressure area is bled off via a variable orifice to proportionately reduce the bucking force against the loading spring as transmission speed increases.

These and further objects inherent in and encompassed by the invention will become apparent as preferred embodiments of the invention are disclosed in detail in the ensuing description and accompanying sheet of drawings, wherein.

Figure 1:
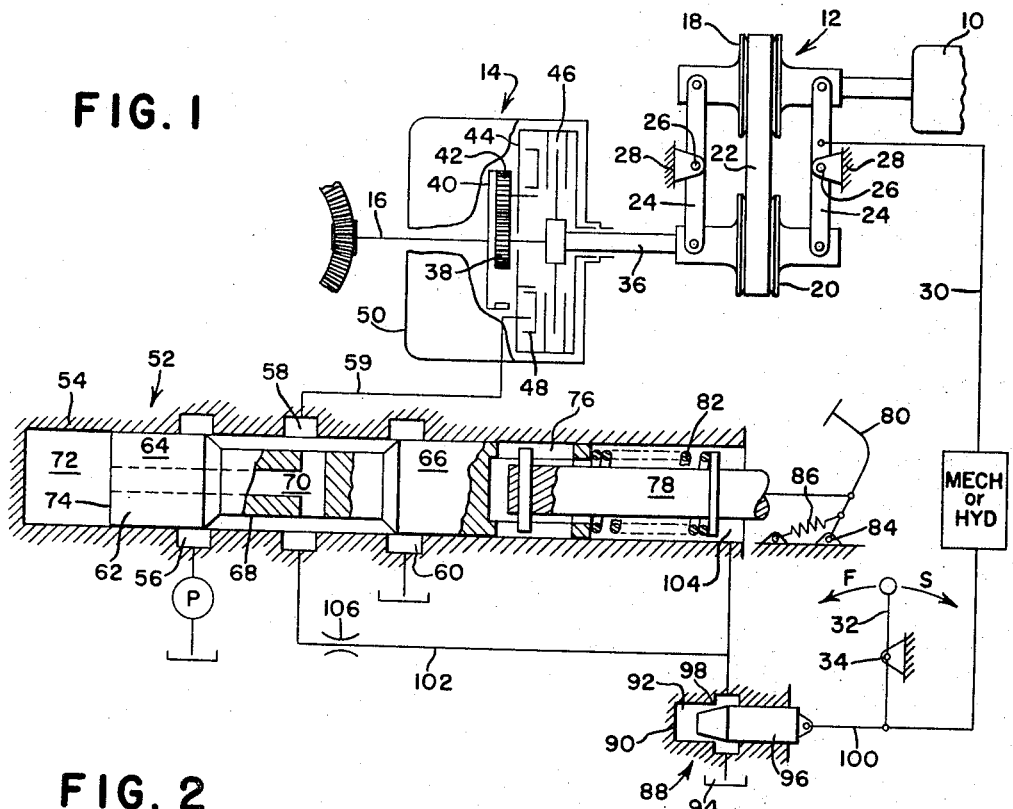
FIG. 1 is a schematic view, partly in section, of a representative power train combined with one form of clutch control.

In the representative power train disclosed here, the power source is a typical governed-speed internal-combustion engine 10 which drives the input side of a change-speed or variable-speed transmission 12, the output side of which in turn drives, for example, a planetary transmission 14 having an output shaft or element 16 for transmitting torque to the final drive of a heavy-duty vehicle; e.g., an agricultural or industrial tractor. The variable-speed transmission has a variable-diameter input or driving sheave 18 connected in known manner to a variable-diameter driven sheave or output element 20 by a belt or chain 22. The relative diameters of the sheaves may be conventionally varied by suitable linkage 24 having intermediate pivots 26 to the vehicle frame 28 and linked by a control system 30 to a control lever 32 pivoted on the frame at 34 and under control of the operator, thus providing means for selectively varying the transmission ratio so as to increase and decrease transmission speed according to the legends shown (F and S).

A variable-speed transmission output shaft 36 coaxially fixed to the variable-diameter driven sheave 20 is the output side of the variable-speed transmission 12 as well as the input shaft for the planetary transmission 14 and is fixed to a sun gear 38 that drives a ring gear 40 by means of planetary pinions 42 on a planetary carrier 44. For present purposes, it is enough to note that the planetary transmission may be locked up in direct drive by clutching the shaft 36 to the carrier 44 by means of a hydraulically applied, spring-disengaged clutch 46 of conventional design and having a hydraulic clutch-engaging piston 48. Another clutch (brake), not shown, may be utilized to lock the carrier to the planetary transmission housing 50—which is part of the vehicle frame—to obtain reverse vehicle speed. When the clutch 46 is engaged, vehicle speed is varied by regulating the variable-speed transmission 12 by means of the control lever 32. Low-speed and consequently high-torque conditions will obtain of course when the sheaves 18 and 20 are respectively at minimum and maximum diameters (low ratio).

The clutch 46 is controlled by means including a pressure-modulated control 52 (FIG. 1) having a valve body 54 provided with a pressure port 56 supplied by a pump P, a clutch port 58 and a reservoir port 60 controlled by a spool valve 62. In its normal position, the spool 62 meters fluid between the ports 56 and 60 by lands 64 and 66 at opposite sides of an axially wide groove 68 that retains communication with the clutch port 58, which leads to the clutch piston 48 by a line 59. An internal passage 70 in the spool 62 connects the groove 68 to a valve body chamber 72 to which the proximate end 74 (bucking pressure area) of the spool 62 is exposed. The other end of the spool has an axial lost-motion connection 76 to a plunger 78 that is in turn connected to a clutch pedal 80. A clutch loading spring 82 is interposed between the plunger 78 and the right-hand end of the spool 62, and the clutch pedal 80, pivoted to the frame at 84, is biased to released (non-depressed) position by a relatively strong pedal return spring 86. The force of the loading spring 82 is balanced against the bucking pressure in the chamber 72 as in a conventional pressure-modulated valve.

To the extent described, clutch control would be as follows: When the clutch pedal 80 is depressed, the force on the loading spring 82 decreases and the spool 62 shifts to the right, cutting off the pressure port 56 by the land 64 and connecting the clutch port 58 to the reservoir port 60, thus allowing the clutch piston 48 to retract and therefore to disengage the clutch 46. As the operator releases the clutch pedal 80 to re-engage the clutch, the loading spring 82 increases in force and the spool 62 moves to the left and begins to open the pressure port 56 and to close the reservoir port 60. Pressure behind the clutch piston 48 builds up as the clutch 46 starts to engage. At the same time, bucking pressure rises, because the clutch port 58 is connected to the bucking chamber 72 by the spool passage 70, and opposes the force of the spring 82, tending to move the spool 62 to the right to a position in which it meters fluid at 56–64 and 60–66. As the operator further releases the clutch pedal, the force in the spring 82 again increases, the spool 62 moves again to the left, and clutch and bucking pressures increase and so on until the pedal is fully released and the clutch 46 is fully engaged. At this time, clutch pressure in the port 58 is a preselected pressure intermediate pump pressure at port 56 and reservoir pressure at port 60.

As previously stated, in a power train where the clutch—as the clutch 46 here—is located behind or downstream of the change-speed transmission—as the variable-speed transmission 12 here—the clutch capacity in high-speed, low-torque conditions far exceeds requirements, leading to loss of the ability of the clutch to slip and to poor control because of short pedal travel and the adverse effects on pressure modulation. To overcome these defects, the invention provides a system in the form of fluid pressure regulating means for controlling pressure modulation and thus clutch pressure by coordinating the clutch control with the ratio changes in the variable-speed transmission 12.

In FIG. 1, a variable-orifice valve 88 includes a valve body 90, a chamber 92 leading to reservoir at 94 and a valve member 96 having a tapered end which combines with the chamber 92 to provide a variable-orifice at 98. The valve member 96 is linked at 100 to the control means 32–30–24 and therefore is responsive to ratio changes in the variable-speed transmission 12. A feedback fluid line 102 interconnects the clutch port 58 and chamber 92 and leads to a feedback chamber 104 in the control valve body 52 at the right-hand end (loading spring end) of the spool 62 for transmitting fluid pressure to the spool area at the spring end of the spool in opposition to the bucking pressure—or as a supplement to the force of the spring 82. A fixed orifice 106 in the line 102 establishes a pressure differential between the bucking chamber 72 and the feedback chamber 104 so as to prevent equalization of pressure.

The coordination between the variable-orifice valve 88 and the variable-speed transmission 12 causes the size of the orifice to increase with transmission speed. At lowest transmission speed, the orifice 98 is highly restricted and therefore feedback pressure in the line 102 and feedback chamber 104 is relatively high, supplementing the force of the spring 82 against bucking pressure in the chamber 72. Since this tends to shift the spool 62 to the left and to open the pressure port 56, clutch pressure rises, enabling clutch 46 to transmit desirable high torque at low transmission speeds. As the clutch pressure rises, so does the bucking pressure and ultimately equilibrium is established to maintain the desired clutch action. Clutch pedal travel will be set at a desirable range, which will be found to be maintained regardless of the transmission ratio.

As transmission speed is increased in the variable-speed transmission 12, torque requirements decrease and it is therefore undesirable to retain high clutch pressure and high torque at high speeds. The necessary decrease in clutch pressure is accomplished here by increasing the size of the variable orifice 98 as transmission speed increases, allowing feedback pressure to diminish to reservoir pressure at 94 instead of building up the feedback chamber 104. Thus, bucking pressure must overcome only the force of spring 82 and consequently lower clutch pressures obtain under higher-speed, lower-torque conditions. In the instance shown here, the variable-speed transmission 12 is infinitely variable and consequently the orifice 98 is also infinitely variable, resulting in infinite variability of feed-back pressure between zero (minimum transmission speed) and maximum (maximum transmission speed). Since clutch pressure, and consequently bucking pressure against feedback pressure, varies with transmission speed, clutch pedal travel will be comparable or uniform regardless of transmission speed, giving all the advantage of clutch pressure modulation, operator "feel" and overload clutch slippage throughout the entire transmission range. This latter feature is of particular significance because the ratio of torque required to torque available becomes relatively fixed, despite changes in transmission, enabling the designer to design or select a clutch that meets predetermined requirements. Without the control provided by the present invention, the aforesaid ratio changes as the transmission ratio is changed.

Figure 2:
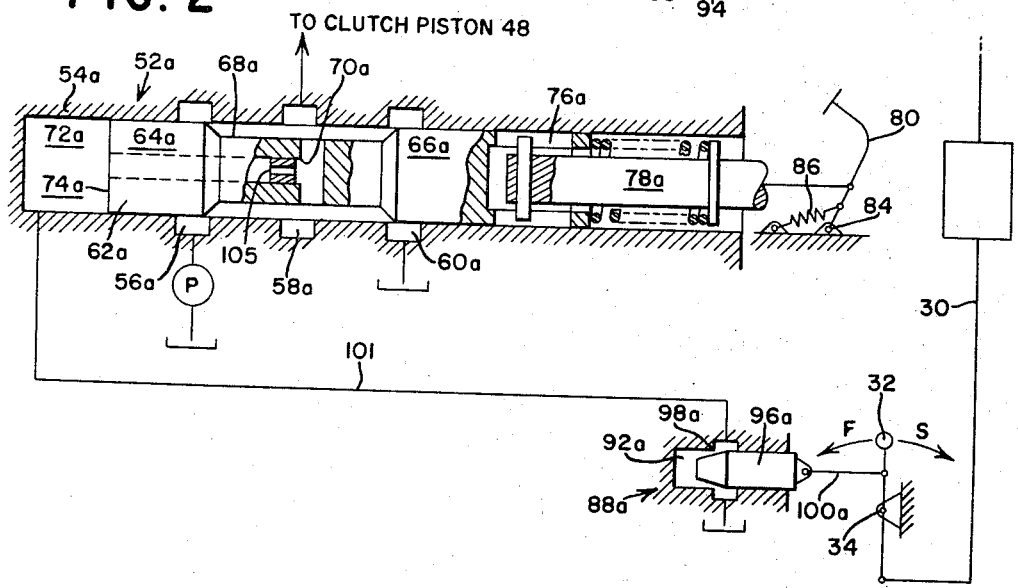
FIG. 2 is a schematic view, partly in section, of a modified form of clutch control usable with the power train of FIG. 1.

That form of the invention shown in FIG. 2 should be regarded as connected to the power train of FIG. 1 in lieu of the valve means 52 etc. The FIG. 2 control includes a valve means 52a similar to the valve 52 and having a valve body 54a formed with pressure, clutch and reservoir ports 56a, 58a and 60a respectively, controlled by a valve spool 62a having lands 64a and 66a separated by a groove 68a. An internal spool passage 70a leads to a bucking chamber 72a to which the end 74a of the spool is exposed as before. The spool 62a is connected to the clutch pedal 80 by a lost-motion connection 76a, loading spring 82a and plunger 78a.

The basic difference over the FIG. 1 control is that here (FIG. 2) fluid pressure is added to and subtracted from the bucking chamber 72a rather than to and from a feedback chamber such as that at 104 in FIG. 1. Nevertheless, the same results are achieved.

The variable-orifice valve means 88a requires that movement of its valve member 96a be reversed and hence this member is connected at 100a to the control lever 32 above the pivot 34 so that the orifice 98a varies inversely with transmission speed. The orifice chamber 92a is connected to the bucking pressure chamber 72a by a fluid line 101, and the spool valve passage 70a is restricted by a fixed orifice 105.

The purpose of the variable-orifice 98a is to regulate the bleed-off from the bucking chamber 72a to reservoir. The orifice 98a is most widely open at minimum transmission speed, giving maximum bleed-off from the bucking chamber 72a. This of course enables the spring 82a to more easily overcome the bucking pressure and thus the spool 62a moves to the left to increase the clutch pressure, which is consistent with low-speed, high-torque conditions. Higher clutch pressure of course means ultimate increase in bucking pressure so that valve equilibrium is achieved.

Accomplishment of lower clutch and bucking pressures at higher speeds is effected as follows: As transmission speed increases, the orifice 98a becomes progressively restricted and therefore less and less fluid flows from the bleed line 101. This means that less and less fluid leaves the bucking chamber 72a and consequently smaller quantities of fluid flow through the orifice 105 to the bucking pressure chamber 72a. With no flow through the orifice 105, there is no pressure drop, and bucking pressure and consequently clutch pressure remain the same. At maximum transmission speed, clutch pressure is relatively low compared with the high pressures at minimum transmission speeds.

In both forms of the invention there has been provided fluid-pressure regulating means operative between the transmission and the clutch control means for varying fluid pressure applied to the clutch means in inverse proportion to the transmission ratio, which is here of course infinitely variable; although the same benefits will be derived from the invention in conjunction with other types of transmissions; e.g., those in which ratio changes are incremental, as in a shifting gear transmission.

Features and advantages other than those categorically enumerated will readily occur to those versed in the art, as will many modifications and alterations in the preferred embodiments disclosed, all without departure from the spirit and scope of the invention.

What is claimed is:

1. A power train comprising a power source, a variable-speed transmission having its input side connected to and driven by said source and including means for selectively varying the transmission ratio, fluid-pressure-engageable clutch means connected to and driven by the output side of said transmission and having a torque-transmitting output element, clutch control means for selectively supplying and exhausting fluid pressure to and from said clutch means for respectively engaging and disengaging same, and fluid-pressure regulating means operative between the transmission and the clutch control means for varying fluid pressure applied to the clutch means in inverse proportion to the transmission ratio.

2. The invention defined in claim 1, in which the clutch control means includes clutch pressure-modulating means having a chamber exposed to fluid pressure applied to the clutch, and the regulating means includes a fluid line in communication with said chamber and having a discharge outlet and variable-orifice means controlling said outlet in accordance with transmission ratio changes.

3. The invention defined in claim 1, in which the clutch control means includes clutch pressure-modulating means having a valve shiftable between clutch-supply and clutch-exhaust positions respectively at opposite sides of a neutral position and normally occupying said neutral position by substantial balancing of spring force and fluid-pressure force acting respectively against opposite ends of said valve, and the regulating means includes a fluid line for varying the hydraulic force, said line being exposed to fluid pressure applied to the clutch and having a discharge outlet and variable-orifice means controlling said outlet in accordance with transmission ratio changes.

4. The invention defined in claim 1, in which the clutch control means includes clutch pressure-modulating means having a valve shiftable between clutch-supply and clutch-exhaust positions respectively at opposite sides of a neutral position and normally occupying said neutral position by substantial balancing of spring force and fluid-pressure force acting respectively against opposite ends of said valve, and the regulating means includes a fluid line for varying the hydraulic force, said line being exposed to fluid pressure applied to the clutch and leading to the spring force end of the valve and further having a discharge outlet and variable-orifice means controlling said outlet in accordance with transmission ratio changes.

5. The invention defined in claim 4, in which said line includes a fixed orifice upstream of both said discharge outlet and the spring force end of said valve.

References Cited
UNITED STATES PATENTS

| | | |
|---|---|---|
| 3,083,801 | 4/1963 | Frohner. |
| 3,126,761 | 3/1964 | Justus et al. |
| 3,307,430 | 3/1967 | Bauder. |

BENJAMIN W. WYCHE III, *Primary Examiner.*